Oct. 6, 1970 E. L. JOHNSON ET AL 3,533,075

DYNAMIC ADDRESS TRANSLATION UNIT WITH LOOK-AHEAD

Filed Oct. 19, 1967 4 Sheets-Sheet 1

INVENTORS
ELLSWORTH L. JOHNSON
ROBERT A. Mc CLURG

BY Nathan Cass
ATTORNEY

Oct. 6, 1970 E. L. JOHNSON ET AL 3,533,075

DYNAMIC ADDRESS TRANSLATION UNIT WITH LOOK-AHEAD

Filed Oct. 19, 1967 4 Sheets-Sheet 3

3,533,075
DYNAMIC ADDRESS TRANSLATION UNIT WITH LOOK-AHEAD

Ellsworth L. Johnson and Robert A. McClurg, Kingston, N.Y., assignors to International Business Machines Corporation, Armonk, N.Y., a corporation of New York Filed Oct. 19, 1967, Ser. No. 678,152
Int. Cl. G06f 9/12
U.S. Cl. 340—172.5 17 Claims

ABSTRACT OF THE DISCLOSURE

A computer dynamic address translation unit operating in conjunction with a page oriented virtual data storage system and providing look-ahead to automatically prevent incomplete execution of an instruction having an operand which extends over more than one page, where one of the pages is unavailable.

The dynamic address translation unit looks ahead by determining whether the operand of an instruction crosses a page boundary, and if so, whether all pages are available. If not, the dynamic address translation unit initiates action of the system to make both of the required pages available and immediately translatable prior to performance of the instruction.

BACKGROUND OF THE INVENTION

The present invention relates to electronic data processing systems of the type employing virtual data storage in which a dynamic address translation unit is employed to convert a logical address provided by an instruction into the actual physical address in the storage unit. Such a system is highly advantageous, particularly for use in time sharing ssytems, since it not only permits each of a plurality of programs from one or more processors to employ its own independent addressing scheme, but also permits each to have an apparent addressing range of virtual storage substantially greater than the entire main storage capacity of the system. A typical manner in which dynamic address translation may be accomplished is disclosed in the commonly assigned copending United States patent application Ser. No. 296,353, filed July 19, 1963, now U.S. Pat. No. 3,317,898 issued May 2, 1967. A more general discussion of virtual storage computer systems and address translation may be found in the article "Machine Organization for Multiprogramming," Peter W. Wegner, Proceedings of 22nd National Conference, Association for Computing Machinery, A.C.M. Publication P-67, August 1967, pages 135–150.

It is not unusual, particularly in a virtual storage system shared by a plurality of programs, for a situation to arise where all of the data to be operated on by an instruction may not be available. This may occur, for example, as a result of the conventional page organization employed for data in a virtual storage system. In such a system, a page is the basic unit for data transfer and each page may be used by one or more prgrams and/or moved from main storage to secondary storage, for example, because of being replaced by a higher priority page. Thus, only a specific number of pages can be available at any one time, the number being dependent upon the system capacity. Since each program uses its own addressing scheme, the actual availability of the required pages will not be known in advance, nor is it desired that a user or programmer have to be concerned with such matters.

Accordingly, if the data to be operated on by an instruction (i.e., the operand) extends over more than one page (which is usually permitted for greater storage efficiency and greater system flexibility), it is possible that the first required page will be available, while the second page will not. Thus, what can happen in a conventional virtual storage system is that an instruction will begin its execution and proceed to access operand data from a first page, via the dynamic address translation unit, until the first page is completed and operand data is then required from the second page. If the second page is unavailable, the instrutcion is then unable to continue and some way of handling the situation must be provided. One possible way is to interrupt the performance of the instruction and store the current status of all registers involved until the required page becomes available, after which the instruction can then continue from the point of interruption. Such an approach is undesirable in that it requires the provision of considerable additional storage.

Another possible way of handling the situation, which obviates the need for additional storage, is to interrupt the performance of the instruction until the page becomes available, and then, instead of storing the current status of the involved registers, the instruction is caused to start over again from the beginning, that is, to repeat. One of the difficulties with such an approach is that partial completion of the instruction may have modified the operand data on the first page, so that repeating the instruction could cause operand data on the first page to improperly be operated on twice. A possible solution to this additional problem would be to provide an unravelling routine which would restore any modified operand data to its original form prior to repeating the instruction. Such a solution is undesirable because it involves the provision of a complex routine and additional hardware as well.

Still other possible solutions involve restricting an operand to a single page, or else reducing the virtual storage capacity available to each program so as to make it unlikely that a required page will be unavailable during the performance of an instruction. Another solution is to use the programmer to solve the problem, for example, by providing an invalid address alarm which would require the programmer to recover from the alarm or modify his program to prevent its occurrence in the first instance. Such solutions are undesirable in that they detract from the basic advantages of a virtual storage system.

SUMMARY OF THE INVENTION

In accordance with the present invention, the solution to the above described partially executed instruction problem is solved in a particularly desirable and advantageous manner which avoids the disadvantages of the other possible solutions considered above. In accordance with the present invention, the dynamic address translation unit is provided with a look-ahead capability which automatically prevents the partially executed instruction situation from occurring in the first instance, and this is accomplished without burdening the programmer with the problem. More specifically, in a typical embodiment of the invention, the dynamic address translation unit, prior to performance of an instruction, first determines whether the instruction is of a type which could cause the problem to occur. If so, the dynamic address unit then looks ahead and determines the availability of not only the initially required page, but also any required additional page. If both pages are not available, the dynamic address translation unit, prior to performance of the instruction, initiates action of the computer processing unit to make both of the required pages available and immediately translatable. As will become evident from the detailed description following, the present invention provides these advantageous features for the dynamic address translation unit in an especially advantageous and expeditious manner requiring a minimum of circuit hardware and software, and without burdening the programmer.

Accordingly, it is the broad object of the present invention to provide improvements in the dynamic address translation portion of a virtual storage computer system, whereby the full advantages of virtual storage may be realized.

A more specific object of the present invention is to provide a dynamic address translation unit having a look-ahead capability which automatically assures that, once started, an instruction can be completed, even when the required operand data is located on different pages.

Another object of the present invention is to provide the dynamic address translation unit with the capability of immediately translating the logical address of each byte of an operand, even when the operand logical addresses cross a page boundary.

A further object of the present invention is to avoid the partially executed instruction problem without burdening the programmer.

A still further object of the present invention is to provide the look-ahead capability for the dynamic translation unit with a minimum of required hardware and software.

The foregoing and other objects, features and advantages of the invention will be apparent from the following more particular description of a preferred embodiment of the invention, as illustrated in the accompanying drawings.

In the drawings.

Like numerals designate like elements throughout the figures of the drawings.

Figures 1, 3:
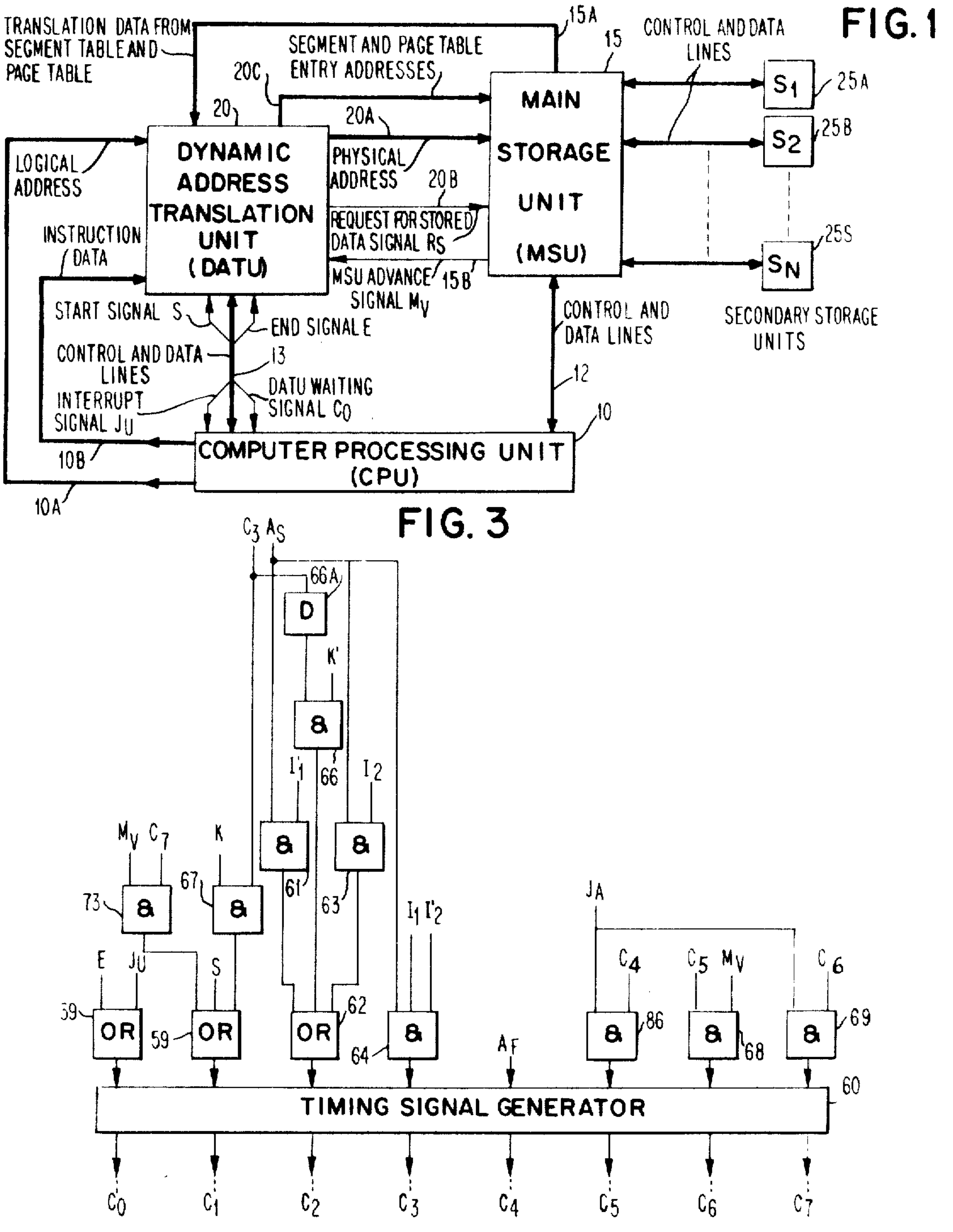
FIG. 1 is a block diagram of an exemplary computer system incorporating the invention.
FIG. 3 is a schematic electrical diagram of a timing signal generator for use in the dynamic address translation unit of FIGS. 2A and 2B.

Since the invention resides primarily in the novel structural combination of well known computer circuits and devices, and not in the specific detailed structure thereof, the structure, control and arrangement of these well known circuits and devices are illustrated in the drawings by the use of readily understandable block representations and schematic diagrams, which only show the specific details pertinent to the present invention in order not to obscure the disclosure with structural details which will readily be apparent to those skilled in the art in view of the description herein. Also, for like purposes, various portions of the systems have been appropriately consolidated and simplified to stress those portions most pertinent to the present invention.

Referring initially to the block diagram of FIG. 1, an exemplary computer system is illustrated comprising a computer processing unit 10, a main storage unit 15 cooperating with a plurality of secondary storage units $S_1$ to $S_N$, and a dynamic address translation unit 20. It is to be understood that the blocks in FIG. 1 do not necessarily represent the mechanical structural arrangement of the exemplary system, which is not within the scope of this invention, but are primarily intended to illustrate the major structural components of the system in a convenient functional grouping, whereby the present invention can be more readily understood. Accordingly, the actual physical arrangement of the system may have one or more of the units in FIG. 1, or portions thereof, incorporated in the same mechanical structure and/or subdivided into additional mechanical structures. Also, in FIG. 1 (as well in FIGS. 2A and 2B), a thick line, such as 10A, is used to represent a plurality of related lines for conveying a plurality of signals, while a thin line, such as 20B, represents a single line for conveying a single signal. The thick lines are used for greater clarity in the drawings to represent a plurality of related lines which may conveniently be treated as a group, and such representations do not necessarily represent actual cables in the system. Also, each thick line is of substantially the same thickness regardless of the number of lines represented thereby.

The main storage unit 15 in FIG. 1, which may be of any suitable form, such as a high speed random access core memory, is page oriented and cooperates with the computer processing unit 10, via lines 12, to provide for the transfer of information between the main storage unit 15 and the secondary units $S_1$ to $S_N$, a page being the basic unit of transfer therebetween. During system operation, pages are constantly being transferred between main and secondary storage, as required for the performance of the operations for which the computer is programmed.

Computer processing unit 10 in FIG. 1 may represent either a plurality of processors, each having its own program, or a single processor unit working with a number of programs. These programs share the main storage unit 15 by the use of a virtual storage approach in which each program may use its own addressing scheme with a total apparent storage capability equal to substantially greater than the total physical storage capability of the main storage unit 15. The total apparent or virtual storage may thus be very much greater than the actual physical storage capacity of the main storage unit 15, and is defined as the total addressing capability of all the programs in the system. Data in this postulated virtual storage is addressed by the use of logical addresses, each program having its own unique set of logical addresses.

During operation of the system, the computer processing unit 10 accesses data in storage by applying its logical address to the dynamic address translation unit 21, via lines 10A, along with accompanying instruction data, via lines 10B. The dynamic address translation unit 20 automatically translates each logical address into the actual physical address of the data, which is applied to the main storage unit 15 via lines 20A.

The total virtual storage of the system may be considered as divided into, for example, 16 segments, each segment having, for example 256 pages, and each page comprising, for example, 2096 bytes, a byte being the minimum-size addressable item of data in the main storage unit 15, for example, 8 bits. The main storage unit 15 is also provided with segment tables and page tables whose entries are constantly updated by the computer processor unit 10, via lines 12. The dynamic address translation unit 20 is able to address selected entries in these segment and page tables, via lines 20A, when required for translating a logical address into the actual physical address of the data in the main storage unit 15. The selected entries from these segment and page tables constitute the required translation data and are conveyed to the dynamic address translation unit 20 via lines 15A. The dynamic address translation unit 20 apprises the main storage unit 15 that it is sending a physical address or a segment or page table address thereto by means of a request for stored data signal $R_S$ applied via line 20B. Conversely, the main storage unit 15 provides advance signal $M_V$ to apprise the dynamic address translation unit that it is sending the stored data requested, which is sent to the dynamic address translation unit 20, via lines 15A, if translation data is requested, or otherwise to the computer processing unit 10, via lines 12.

So far, the description of the exemplary embodiment in connection with FIG. 1 has been concerned with the general operations typical to a computer system employing virtual data storage and a dynamic address translation unit. As mentioned earlier herein, such a system provides important advantages, since each program may use its own addressing scheme with an addressing capacity substantially greater than the total storage capacity of the main storage unit 15, even though there may be many other programs being run in the system. The presence and availability of pages in the main storage unit 15 of such a system is governed by a supervisory program, which, based upon use and priority considerations, will cause the computer processing unit 10 to appropriately transfer predetermined pages between the main storage unit 15 and the secondary storage units $S_2$ to $S_N$, as required for overall system operation.

It may occur, therefore, that a logical address sent to the dynamic address translation unit 20 in FIG. 1 may request data from a page which is either not in the main storage unit 15, or for some reason is unavailable, for example, because it is being used by another program. The conventional way of handling the situation is for the dynamic address translation unit 20 to appropriately signal the computer processing unit 10, such as by a signal $J_U$ applied via one of lines 13, that the data requested by the logical address is on a page which is unavailable. If the logical address corresponds to the first byte of an operand, the computer processing unit 10 will hold up or defer execution of the instruction until the required page containing the requested byte can be fetched into the main storage unit 15 and/or made available, as the case may be, after which the instruction will be permitted to begin its execution. However, as pointed out at the beginning of this specification, even though the first page of an operand has been made available, a partially executed instruction problem can be created when the operand crosses a page boundary, since the second page to which the operand extends may not be available, and an interruption to fetch it once operand accessing has begun can require the provision of undesirable complexities in hardware and/or software depending upon which of the various known alternative approaches are used, as discussed previously. The manner in which the present invention advantageously provides for a solution to this problem will now be described with additional reference to the exemplary embodiment of the dynamic address translation unit illustrated in FIGS. 2A, 2B and 3 and the functional flow diagram of FIG. 4.

Figure 2B:
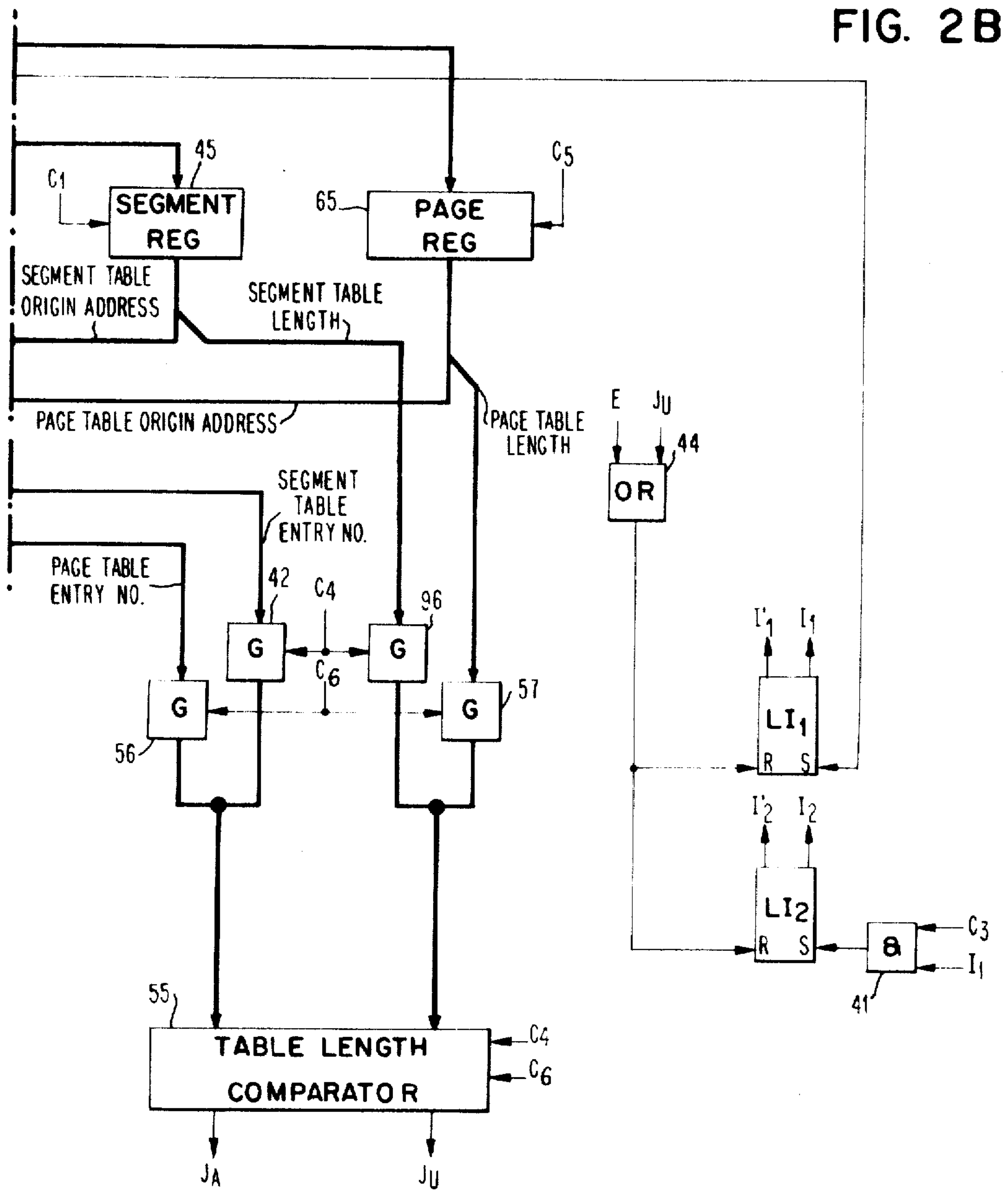
FIGS. 2A and 2B are schematic electrical diagrams illustrating the construction and arrangement of the dynamic address translation unit of FIG. 1 in accordance with the invention.
Figure 2:
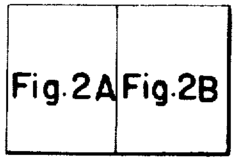
FIG. 2 is a diagram illustrating the relationship between FIGS. 2A and 2B.
Figure 2A:
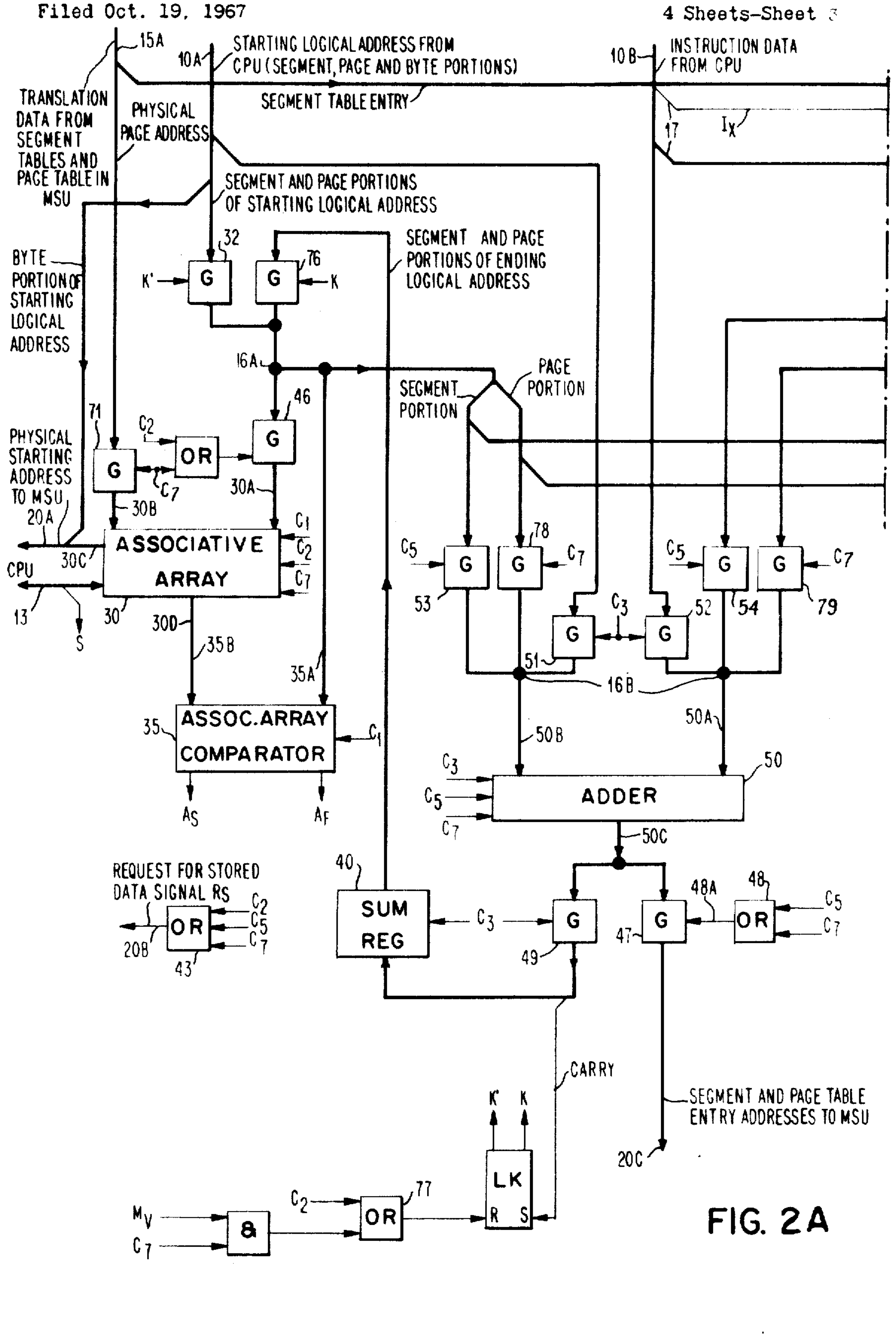

Before considering FIGS. 2A, 2B and 3 in detail, some initial comments will first be presented to aid in understanding the representations shown therein. As mentioned previously, a thin line, such as 15B in FIGS. 1 and 2A, represents a single line for conveying a single signal, while a thick line, such as 15A in FIGS. 1 and 2A, represents a plurality of related lines for conveying a plurality of related signals which may conveniently be treated as a group, all of the thick lines being of substantially the same thickness regardless of the number of lines represented thereby. With particular regard to FIGS. 2A and 2B, it is to be understood that the provision of a dot at the junction of two or more thick lines is used to indicate that the same group of lines represented by an initial thick line is being coupled in parallel to different circuits, such as indicated at junction 16A in FIG. 2A above AND gate 46; a dot will also be used to indicate that a plurality of groups are being coupled in parallel to form a common group, such as indicated at junctions 16B above inputs 50A and 50B of adder 50.

Where less than all of the lines of a group represented by a thick line in FIGS. 1, 2A and 2B are to be applied to a particular circuit, the thin or thick lines involved are shown separating from the thick line at an oblique angle with no dot, such as indicated at 17 in FIG. 2A for input lines 10B. The thick line following the oblique separation usually contains only the remaining lines of the group, but may also contain lines corresponding to one or more of those which were separated. Where two lines (whether thick or thin) cross each other at right angles without a dot at their junction, no connection therebetween is intended.

It is also to be noted with respect to FIGS. 2A, 2B and 3, that a logical AND gate, such as indicated by numeral 41 at the set input of latch $LI_2$ in FIG. 2A, is conventionally represented by a square having a "&" inside, while a logical OR gate such as illustrated by numeral 43 in the lower left of FIG. 2A, is conventionally represented by a square having an "OR" inside. These AND and OR gates are used in FIGS. 2A, 2B and 3 in a conventional manner with the thin lines illustrated therein, which are the same as the usual single lines of a circuit diagram. Where an entire group of lines represented by a thick line are to be gated together in response to a common control signal, the group of AND gates required for this purpose are conveniently shown in FIGS. 2A, 2B and 3 by a single small square having a G inside, such as indicated by numeral 47 in FIG. 2A at the output of adder 50; the thick line representing the group of lines to be gated is shown applied to the block vertically, while the controlling signal which opens the AND gates of the gate block to permit the signals on the lines of the group to pass therethrough, is shown applied to the block horizontally by a thin line containing the controlling signal, which may be the output of a conventional OR or AND gate, such as illustrated by OR gate 48 whose output 48A is applied to AND gates 47 in FIG. 2A.

It is further to be noted with respect to FIGS. 2A and 2B that, for the purpose of this exemplary description, the latches shown therein may be considered as being of a conventional type which are responsive to the leading edge of a "true" signal applied to their "set" or "reset" inputs. Also, where desirable or necessary, it is to be assumed that an appropriate delay occurs before the latch outputs change in response to a true input signal, as is conventionally done in order to avoid premature changes in logical input levels which might arise as a result of a too fast changing latch output. Each latch is shown with unprimed and primed outputs in a conventional manner, the unprimed latch output being "true" when the latch is set and "false" otherwise, and vice versa for the primed latch output.

Continuing with the initial comments concerning the representations used in the drawings, reference is now directed to FIG. 3 which illustrates a timing signal generator 60, which may be of conventional form, for controlling the dynamic address translation unit 15. It is to be understood that, for purposes of simplicity, the various signals generated by timing signal generator 60 have been reduced and combined to those pertinent for the present invention, and are represented by timing signals $C_0$ to $C_7$. Only one of these timing signals is generated by generator 60 at any one time, and remains available in the main storage unit, the dynamic address translation unit translates the segment and page portions of the logical address into the physical address of the selected page in the main storage unit; the byte logical address portion is not translated, but is combined with the physical page address to provide the complete physical address, whereby the selected byte in the selected page of main storage unit 15 can be accessed.

As for the operands used in the system, it will be understood that these operands constitute the data which is to be processed. In the present invention, each operand may comprise many bytes and may extend over more than one page. As is conventional, the processing of operands is performed by instructions. A typical instruction designates the particular type of operations to be performed, the operand or operands on which the designated operations are to be performed, and the number of bytes comprising each operand. Because of the undesirability of burdening the programmer or user, the instruction does not of itself indicate whether an operand crosses a page boundary. For the purposes of the description to be presented herein in connection with FIG. 4, it will be assumed that the instruction contains only one operand, it being understood that additional operands in an instruction can be similarly handled. It will also be assumed for the purposes of this description that an operand extends over no more than two pages.

The manner in which the bytes of an operand are present until a new timing signal is generated. The logical signals and circuit shown above generator 60 in FIG. 3 designate the conditions which cause each to be generated. As with the latches in FIG. 2A, the generation of a new timing signal by timing signal generator 60 will be considered to occur in response to the leading edge of a true signal applied thereto, an appropriate delay being provided where necessary or desirable.

It will be noted that certain ones of the timing signals in FIG. 3 are shown being applied in FIGS. 2A and 2B to an associative array 30, an associative array comparator 35, a sum register 40, a segment register 45, an adder 50, a table length comparator 55, and a page register 65. The circuitry represented by these blocks are well known in the art and will readily be providable in view of the description provided herein; the timing signals shown applied thereto serve to activate appropriate operation thereof during the required periods. For example, associative array 30 in FIG. 2 will operate during the generation of timing signals $C_1$, $C_2$ and $C_7$.

It will now be helpful to briefly consider the nature of the logical addresses, operands and instructions of the exemplary embodiment being considered herein.

Figure 4:
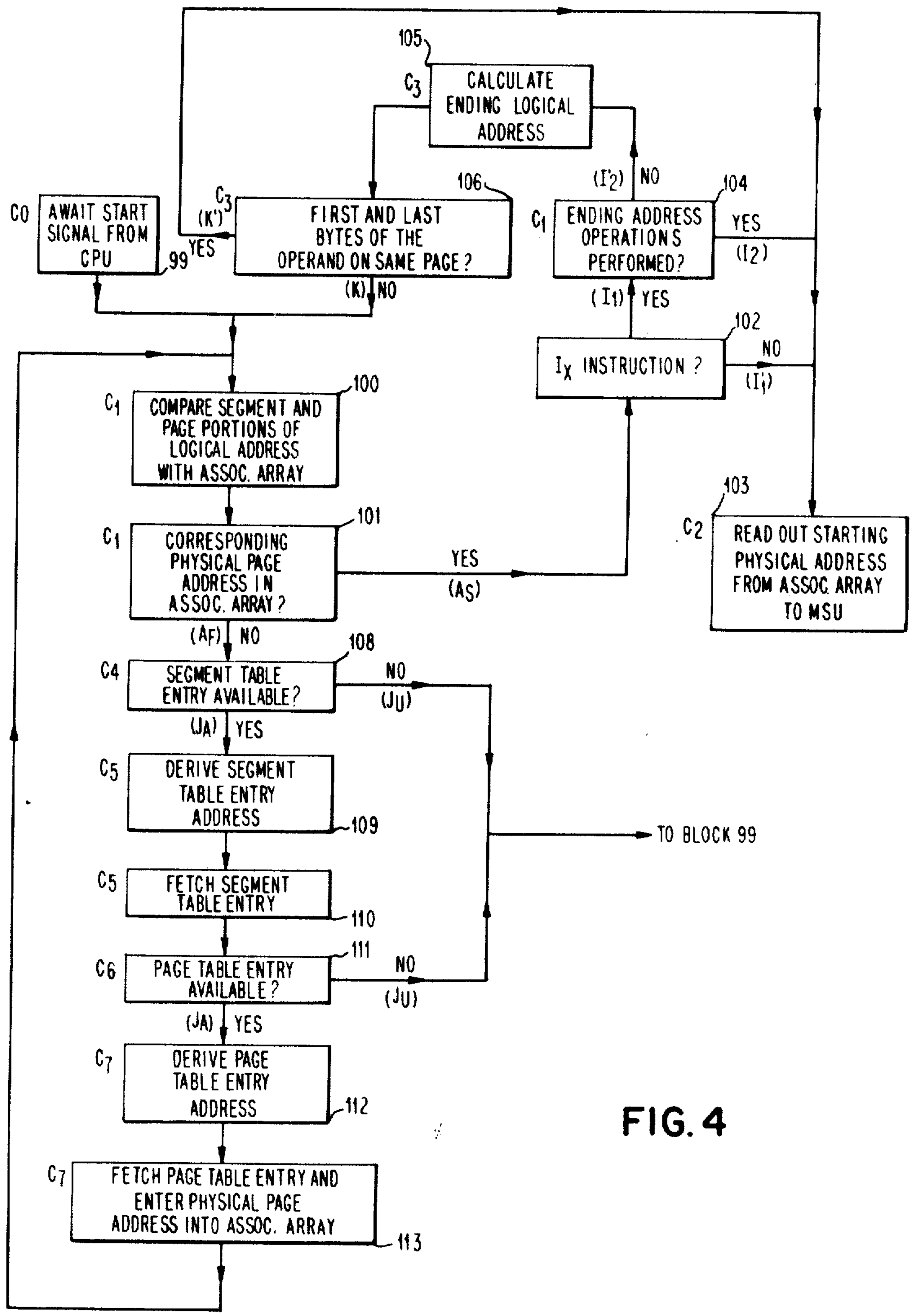
FIG. 4 is a flow diagram illustrating the functional steps performed in the operation of the exemplary system in accordance with the invention.

The logical address provided by the computer processing unit comprises a segment portion, a page portion and a byte portion which together designate a particular byte of a selected page. The organization of the system is such that, when the selected page is accessed for the performance of the operations called for by an instruction in this exemplary embodiment is as follows. The computer processing unit first supplies the starting logical address of an operand, which is the logical address corresponding to the first byte of the operand. After the first byte has been succeessfully accessed from the main storage unit, the computer processing unit then supplies the logical address of the second byte of the operand, and so on, until the last byte of the operand has been accessed. As mentioned earlier, a partially executed instruction problem could arise if the operand address crosses a page boundary to a page which is unavailable. The manner in which the present invention provides the dynamic address translation unit with a look ahead capability so as to prevent the occurrence of this problem, as well as providing the dynamic address translation unit with the capability of rapidly translating the logical addresses of all bytes of an operand once accessing thereof has begun, will become clearly evident from the next following detailed description of FIGS. 2A, 2B and 3 using the functional flow diagram of FIG. 4. As an aid in more readily understanding FIG. 4, the particular timing signal of FIG. 3 which is generated by generator 60 during the occurrence of the operations described in each functional block in FIG. 4 is indicated adjacent the upper left hand corner of the block. Also, where the flow can proceed to one or the other of two blocks in FIG. 4, the signal in FIGS. 2A and 2B which determines which block is next is additionally indicated along with the YES or NO indication.

As indicated by block 99 in FIG. 4, the starting point for the detailed description of the invention will be the transmission by the computer processing unit 10 (FIG. 1) to the dynamic address translation unit 20 of a start signal S, via one of lines 13, at which time the starting logical address of the operand is also applied, via lines 10A, along with appropriate instruction data, via lines 10B. This start signal S is applied, via OR gate 59 in FIG. 3, to timing control generator 60 (which generates signal $C_0$ while awaiting start signal S), to cause generator 60 to next generate signal $C_1$, activating associative array 30 and associative array comparator 35 in FIG. 2A.

Associative array 30 in FIG. 2A is provided to give the address translation unit the ability to store, for purposes of rapid address translation, the physical page addresses corresponding to a relatively small number of logical addresses. These logical addresses in associative array 30 may be transferred to or received from the computer processing unit, via lines 13, in accordance with any desired priority system. The priority system is such that the presence of these physical page addresses in associative array 30 is an indication that the respective pages in the main storage unit are available for access. Typically, associative array 30 may comprise eight registers, each containing the segment and page portions of a recently translated logical address and the physical page address in the main storage unit corresponding thereto.

As a result of associative array 30 being activated during $C_1$ along with associative array comparator 35, the segment and page portions of the eight logical addresses stored in each of the eight registers of associative array 30 are applied to input 35B of associative array comparator 35 for parallel comparison with the segment and page portions of the logical address supplied by the computer processing unit and applied to input 35A of associative array comparator 35 via AND gates 32 (K' being true). These operations are indicated by blocks 100 and 101 in FIG. 4 to which the flow preceeds from block 99. It will be assumed for the present that a successful comparison is obtained, in response to which associative array comparator 35 provides a true output signal $A_S$, causing the flow in FIG. 4 to next proceed to block 102.

Block 102 indicates the performance of a check during signal $C_1$ to determine whether the present instruction is of a type designated $I_X$, which could cause the previously described partially executed instruction problem to occur if the operand should cross a page boundary. The presence of an $I_X$ instruction will be indicated by the status of latch $LI_1$ in FIG. 2B which will have been set by an $I_X$ signal applied by a respective one of instruction data lines 10B (FIG. 2A). If latch LI is not set, indicating that the instruction is of a type which will not cause a problem (such as an instruction having an operand which is necessarily contained on only a single page), then no special procedures are necessary, and generator 60 in FIG. 3 next generates signal $C_2$, causing the flow to proceed to block 103 in FIG. 4 for completion of the translation operation on the starting logical address. More specifically, signal $C_2$ produces the request for stored data signal $R_S$, via OR gate 43 in FIG. 2A, opens AND gates 46, and activates associative array 30 to read out, on output line 30C, the starting physical page address corresponding to the segment and page portions of the starting logical address, applied thereto via AND gates 46. This starting physical page address is combined with the byte portion of the starting logical address to produce the resultant physical address of the first byte of the operand, which is applied to the main storage unit 15 (FIG. 1) via lines 20A along with the request for stored data signal $R_S$ to access the first byte of the operand. It will be understood with reference to FIG. 3 that signal $C_2$ will be the next timing control signal generated by generator 60 where no $I_X$ signal is provided to set latch $LI_1$, since output $I_1'$ of latch $LI_1$ will then be false when output $A_S$ of associative array comparator 32 becomes true, thereby causing AND gate 61 to apply a true output signal, via OR gate 62, to cause generator 60 to next generate signal $C_2$.

If, on the other hand, the instruction is of a type that could cause a partial instruction execution problem to occur if the operand crosses a page boundary, which will now be assumed, then the $I_X$ signal will be provided by the computer processing unit to set latch LI, to make output $I_1$ thereof true. As a result, the operations occurring during signal $C_1$ indicated by block 104 in FIG. 4 will then become pertinent. Block 104 indicates the performance of a check during signal $C_1$ to determine whether or not the necessary ending address operations have been performed to prevent occurrence of the partial instruction execution problem in the event of the operand crosses a page boundary. If such operations have been completed, latch $LI_2$ in FIG. 2B will be set to make $I_2$ true when signals $A_S$ becomes true, causing generator 60 in FIG. 3 to next generate signal $C_2$, in response to a true signal received via AND gates 63 and OR gate 62. The flow in FIG. 4 will thus next proceed to block 103 in which the staarting physical page address is read out from associative array 30 and combined with the byte portion of the starting logical address for application to the main storage unit as before.

If the required ending address operations have not yet been performed on an $I_X$ instruction, as will now be assumed, then latch $LI_2$ in FIG. 2B will not be set, so that output $I_2'$ will be true along with output $I_1$ when signal $A_S$ becomes true, causing AND gate 64 in FIG. 3 to produce a true signal to cause generator 60 to next generate signal $C_3$, instead of signal $C_2$. The flow in FIG. 4 thus proceeds to block 105 and 106, instead of 103. In blocks 105 and 106, it is determined whether the operand crosses a page boundary by calculating the ending address of the operand, and checking whether it is on a different page from the starting logical address. This is accomplished by signal $C_3$ activating adder 50 and sum register 40 in FIG. 2, as well as opening AND gates 49, 51 and 52. As a result, an appropriate portion of the logical address contained on respective ones of lines 10A is added to an appropriate portion of the instruction data contained on respective ones of lines 10B. The sum, which will be the segment and page portions of the ending logical address, is applied to sum register 40, while a carry, if it occurs, is applied to set latch LK. Also, during signal $C_3$, latch $LI_2$ in FIG. 2B is set via AND gate 41, to indicate that the required ending address operations have been performed.

In the exemplary embodiment being considered herein, the addressing organization is such that the occurrence of a carry at the output of adder 50 during signal $C_3$ indicates that the starting and ending operand addresses correspond to different pages; that is, the first and last bytes of the operand are on different pages. Conversely, if no carry occurs, it is an indication that the first and last bytes of the operand are on the same page, in which case, the contents of sum register 40 can be ignored, and generator 60 in FIG. 4 will next generate signal $C_2$ following $C_3$ to cause the flow in FIG. 4 to proceed from block 106 to block 103 during which the physical address is read out and applied to the main storage unit as before. Accordingly, generator 60 next produces signal $C_2$ as a result of signal K' being applied to AND gate 66 along with signal $C_3$ applied via a delay 66A chosen so that the delayed $C_3$ signal does not arrive at AND gate 66 until after the time by which latch LK in FIG. 2 would be set in response to a carry. Accordingly, when no carry is produced, signal K' will be true when the delayed $C_3$ signal arrives at AND gate 66, causing a true signal to be applied via OR gate 62, to cause generator 60 to next produce signal $C_2$ following signal $C_3$.

It will be understood that, having determined that the physical page address corresponding to the starting logical address is in associative array 30 in FIG. 2A, the determination that the first and last bytes of the operand of an $I_X$ instruction are both on the same page permits all of the subsequent bytes of the operand to now be directly translated by the dynamic address, since the physical page address will be the same for all. In other words, as the subsequent logical addresses of an operand are successively applied to the dynamic address translation unit following the starting logical address, the same physical page address will be read out from associative array 30 for all; the byte portion of each logical address is combined therewith to provide the resultant physical address required for accessing each respective byte of the operand. During this accessing of the operand, latches $LI_1$ and $LI_2$ remain set to cause operations for each applied logical address of the operand following the starting logical address to flow through blocks 100, 101, 102 and 103 in FIG. 4. After the last byte of the operand has been accessed, the computer processing unit sends an end signal E, via a respective one of lines 13 in FIG. 1, which resets latches $LI_1$ and $LI_2$ in FIG. 2B via OR gate 44, and returns generator 60 in FIG. 3 to its initial generating signal $C_0$ via OR gate 39.

It will now be assumed that latch LK in FIG. 2 is set as a result of a carry being produced by adder 50 during signal $C_3$, indicating that the first and last bytes are on different pages, whereupon a partially executed instruction problem could occur if the second page is not available. If the partial instruction execution problem is to be prevented, steps must be taken to ensure that both pages are available before accessing of the operand from the main storage unit is initiated. It is already known that the page containing the first byte of the operand is available, since it was determined during signal $C_1$ (blocks 100 and 101 in FIG. 4) that the physical page address corresponding to the starting logical address is in associative array 30. To determined whether the page containing the last byte of the operand is available, operations are caused to proceed from block 106 in FIG. 4 to *blocks* 100 and sponding to the ending logical address of the operand is in associative array 30. For this purpose, generator 60 in FIG. 3 is caused to again generate signal $C_1$ following signal $C_3$, which occurs in response to the output of AND gate 66 providing a true signal, via OR gae 59, as a result of output K of latch LK becoming true during signal $C_3$ because of the ocurrence of a carry.

Since signal K is true while K' is false during this second occurrence of signal $C_1$, the segment and page portions of the ending logical address which were placed in sum register 40 during signal $C_3$ are now applied, via AND gate 76, to associative array comparator 40 for comparison with the segment and page portions of the logical addresses stored in associative array 30. It will be assumed for the present that a successful comparison is achieved, thereby indicating that the second page onto which the operand extends is available for immediate translation, in which case, the flow will again proceed to block 102 in FIG. 4. Since latch $LI_2$ was set during signal $C_3$ to indicate the performance of the required ending address operations, AND gate 63 in FIG. 3 will now become true as a result of signal $I_2$ being true when associative array comparator 35 produces true signal $A_S$ in response to a successful comparison. A true signal will thus be applied, via OR gate 62, to cause generator 60 to next generate signal $C_2$ which resets latch LK via OR gate 77. Operations thus proceed to block 103 in FIG. 4 to cause application of the starting physical address to the main storage unit as before.

It will be understood that because the physical page addresses of both pages to which the operand is assumed to extend have been determined to be in associative array 30, and thus available for access, no partially executed instruction problem can occur, even though the operand crosses a page boundary. Furthermore, the bytes of the operand on both pages can be immediately translated by the data translation unit, since the resultant physical address required for each applied logical address can be obtained by combining its byte portion with the corresponding physical page address read out of associative array 30, which will be either that of the starting or ending physical page address, as the case may be.

The description so far has considered the situation where the physical page addresses of both the starting and ending addresses of an operand extending over two pages are already in associative array 30. Since associative array 30 has only limited storage capability, the physical page address of one or both pages of an operand may not be in associative array 30, or even in the main storage unit. The manner in which such situations are handled in accordance with the present invention is illustrated by blocks 108 to 113 in FIG. 4 which will now be considered in detail by assuming that the physical address of neither page of an operand extending over two pages is in associative array 30. For this purpose, the description will return to the operations in blocks 100 and 101 in FIG. 4 occurring during the first signal $C_1$ generated by generator 60 in FIG. 3, at which time the segment and page portions of the starting logical address were compared with the segment and page portions of the logical addresses stored in associative array 30.

Since it is now assumed that the physical page address of the starting logical address is not in associative array 30, associative array comparator 35 in FIG. 2B will produce a true signal $A_F$ indicating the failure of the comparison, and causing generator 60 in FIG. 3 to next generate signal $C_4$ following signal $C_1$, instead of $C_2$ or $C_3$ as before. Operations thus proceed to blocks 108 to 113 in FIG. 4 during which the segment and page portions of the logical address are employed to derive the location of the required physical page address in the main storage unit and, if available, or after being made available, is accessed and loaded into associative array 30 along with the applied starting logical address. It is to be noted that, when the physical page address is found not to be in associative array 30, the setting of latch $LI_1$ in FIG. 4 is ignored during blocks 108 and 113, since the operations occurring will be the same regardless of whether the instruction is of a type which could cause a partially executed problem to occur. In either case, it is necessary to bring the corresponding physical page address into associative array 30.

In order to bring the physical page address corresponding to an applied starting logical address into associative array 30 when it is found not to be there, it is necessary to appropriately employ the segment and page portions of the applied starting logical address to derive the location of the physical page address in the main storage unit. As mentioned earlier, this is accomplished using translation data contained in segment and page tables maintained in the main storage unit by the computer processing unit acting under the control of a supervisory program. The specific manner in which the data address translation unit exemplified in FIGS. 2A, 2B and 3 accomplishes this translation will now be considered in detail.

When the starting logical address of an operand is applied to the dynamic address translation lines, via lines 10A, an appropriate portion of the instruction data applied along therewith, via lines 10B, loads segment register 45 in FIG. 2B with information designating the originating address and length of a segment table in the main storage unit. Each segment table contains a plurality of entries, each entry in turn designating the origin and length of a page table; the number of such entries contained in a segment table constitutes the length of the segment table. The segment portion of the applied starting logical address contains a segment entry number designating a particular entry in the segment table designated by segment register 45. If this segment entry number is greater than the segment table length indicated by segment register 45, it is an indication that no page table is presently set up in the main storage unit for the physical page corresponding to the applied starting logical address, in which case, the required page is unavailable, for example, because it is in secondary storage.

It is thus necessary to first determine whether the segment table entry number indicated by the segment portion of the starting logical address is greater than the length of the particular segment table whose origin and length have been loaded into segment table register 45 in FIG. 2B by the instruction data. This is the operation indicated in block 108 of FIG. 4, and is accomplished by signal $C_4$ activating table length comparator 35 in FIG. 2B and opening AND gates 42 and 96 so as to permit comparison of the segment table length loaded into segment register 45 by the instruction data with the segment entry number indicated by the segment portion of the starting logical address. Assuming for the moment that the segment entry number is greater, then table length comparator 55 provides an output signal $J_U$ to indicate that the segment table entry is unavailable. Generator 60 in FIG. 3 will then next generate signal $C_0$ following $C_4$, causing the dynamic translation unit to return to its initial state to await suitable action by the computer processing unit in response to signal $J_U$ applied thereto during signal $C_4$, via one of lines 13. The computer processing unit may choose to immediately set up the required entry in the segment table, or defer performance of the instruction until after other instructions are performed, in which case, the dynamic address translation unit is able to translate operand addresses of other instruction, since it was returned to its initial state following signal $C_4$.

When the computer processing unit has made the required entry available in the segment table called for by the instruction, and is ready to perform the instruction it could not previously perform because this entry was unavailable, the computer processing unit transmits start signal S again along with the starting logical address and the associated instruction data. The dynamic address translation unit is thus caused to begin operations over again starting with block 99 in FIG. 4. When the flow reaches block 108 again as a result of signal $C_4$ being generated following signal $C_1$, table length comparator 55 will now find that the segment entry number indicated by the segment portion of the starting logical address is not greater than the segment table length indicated by segment register 45, since the computer processing unit will have added the previously absent entry to the segment table.

When table length comparator 55 finds that the segment entry number indicated by the segment portion of the logical address is not greater than the segment table length indicated by segment register 45 (either initially or after operations are started over again), then table length comparator 55 generates true output signal $J_A$ which makes AND gate 86 in FIG. 3 true to cause generator 60 to next produce signal $C_5$; operations then proceed to blocks 109 and 110 in FIG. 4. In blocks 109 and 110, the address of the specific segment table entry called for by the segment portion of the starting logical address is derived and applied to the main storage unit via lines 20C. This is accomplished by signal $C_5$ activating adder 50 and opening AND gates 47, 53 and 54; as a result, the segment portion of the starting logical address is caused to be added to the segment table origin address provided by segment register 45, and the sum, which is the segment table entry address, is applied, via lines 20C, to the main storage unit along with the request for stored data signal $R_S$ produced by signal $C_5$ via OR gate 43.

The dynamic address translation unit then awaits receipt of the advance signal $M_V$ (FIG. 1) from the main storage unit 15, which indicates that the segment table entry called for has been sent, via lines 12A, and loaded into page register 65 in FIG. 2A. Signal $M_V$ occurring during signal $C_5$ is applied to AND gate 68 in FIG. 3 to cause generator 60 to next produce signal $C_6$, whereupon operations proceed to block 111 in FIG. 4.

The segment table entry loaded into page register 65 in FIG. 2B designates the originating address and length of a page table containing a plurality of entries, each entry in turn designating a physical page address; the number of such entries contained in a page table constitutes the length of the page table. The page portion of the applied starting logical address contains a page entry number designating a particular entry in the page table designated by page register 65. If this page entry number is greater than the page table length indicated by the page register 65, it is an indication that no physical address has been set up in the main storage unit for the page requested, in which case, the required page is unavailable. This type of check on page availability insures that, even though a page table has been set up for the page in the main storage unit, as indicated by a successful check being obtained in block 108 during signal $C_4$, the required page has, in fact, been brought into the main storage unit and is available to the particular instruction requesting same, which will be indicated by the assignment of a physical page address thereto in the corresponding page table.

Accordingly, operations in block 111 in FIG. 4 occurring during signal $C_6$ are basically the same as in block 108 occurring during signal $C_4$, except that table length comparator 55 in FIG. 2 now compares the page table length loaded into page register 65 with the page entry number indicated by the page portion of the applied starting logical address. It will be understood that such a comparison occurs as a result of signal $C_6$ activating table length comparator 55 and operating AND gates 56 and 57 in FIG. 2B to cause the page entry number contained in the page portion of the starting logical address to be applied to table length comparator 55 concurrently with the page table length from page register 65.

If table length comparator 55 in FIG. 2B finds that the page table number is greater, then signal $J_U$ is produced and the same operations occur as previously described when signal $J_U$ was produced in block 108 during $C_4$; that is, generator 60 in FIG. 3 generates its initial signal $C_0$ in response to signal $J_U$, causing the dynamic address translation unit to return to its initial state to await appropriate action by the computer processing unit. When the computer processing unit has added the required page table entry to the page table and is ready to perform the instruction not previously performed because this entry was unavailable, the computer processing unit transmits start signal S again to cause operations to start over again from block 99 in FIG. 4.

When table length comparator in FIG. 2B finds that the page entry number indicated by the page portion of the starting logical address is not greater than the page table length indicated by page register 65 (either initially or after operations are started over again), then table length comparator 55 produces a true output signal $J_A$ which makes AND gate 69 true in FIG. 3 to cause generator 60 to next produce signal $C_7$ following signal $C_6$, whereupon operations proceed to blocks 112 and 113 in FIG. 4.

In blocks 112 and 113 occurring during signal $C_7$, the address of the specific page table entry called for by the page portion of the starting logical address is derived and applied to the main storage unit via lines 20C. This is accomplished by signal $C_7$ actuating adder 50 and opening AND gates 47, 78 and 79; as a result, the page portion of the starting logical address is caused to be added to the page table origin address provided by page register 65, and the sum, which is the page table entry address, is applied, via lines 20C, to the main storage unit along with the request for stored data signal $R_S$ produced by signal $C_7$ via OR gate 43.

The dynamic address translation unit then awaits receipt of the advance signal $M_V$ (FIG. 1) from the main storage unit 15, which indicates that the requested page table entry called for has been sent, via lines 15A, to the dynamic address and translation unit and loaded into associative array 30 in FIG. 2A along with the corresponding segment and page portions of the starting logical address. This loading is accomplished as a result of signal $C_7$ opening AND gates 46 and 71 and activating associative array 30 to cause the physical page address received from the main storage unit and the segment and page portions of the starting logical address to be stored in an appropriate register of associative array 30. If all registers are full, the one which has retained its data longest is removed and replaced by the new data. The receipt of $M_V$ during signal $C_7$ following this storage in associative array 30 causes a true signal to be applied to generator 60 in FIG. 3, via AND gate 73 and OR gate 59, to cause generation thereby of signal $C_1$ again, whereupon the flow proceeds back to blocks 100 and 101 in FIG. 4.

Since the physical page address corresponding to the applied starting logical address has been placed in associative array 30 during blocks 108 to 113, operations in blocks 100 and 101 will result in a successful comparison just as occurred when it was previously assumed that the physical page address was initially in associative array 30. It will be remembered that a successful comparison causes the flow to proceed to block 102 for determination as to whether an $I_X$ instruction is involved, that is, an instruction which could cause a partially execution instruction problem to occur if the operand crosses a page boundary. If an $I_X$ instruction is not involved, no further operations are required and the flow is to block 103, as previously described, to cause the physical page address in associative array 30 to be read out and combined with the byte portion of the starting logical address to obtain the complete physical address, which is then applied to the main storage unit for accessing the first byte of the operand.

If an $I_X$ instruction is involved, it will be remembered from the previous description that the flow is to block 104 in FIG. 4 to check whether the required ending address operations have been performed; if so, the flow is to block 103 to begin accessing the operand. If the required ending address operations required of an $I_X$ instruction have not been performed, it will be remembered that the flow is to blocks 105 and 106 to calculate the ending logical address of the operand to determine whether the last byte of the operand is on the same page as the first byte of the operand. If so, the presence of the starting physical page address in associative array 30 is sufficient to provide for rapid translation of all bytes of the operand, and the flow then proceeds to block 103 to begin accessing of the operand.

It will be remembered from the previous description that, if the last byte of the operand is found in block 106 to not be on the same page as the first byte of the operand, as indicated by the setting of latch LK in FIG. 2A in response to the appearance of a carry at the output of adder 50 during signal $C_3$, then a partially executed instruction problem could occur if the second page containing the last byte is not available. Generator 63 thus is caused to again generate signal $C_1$ and the flow proceeds to blocks 100 and 101 to determine whether the physical page address corresponding to the ending logical address is in associative array 30. Since K is true as a result of latch LK having been set in block 106 during signal $C_3$, AND gate 76 in FIG. 2A will be open during signal $C_1$ to cause the output of sum register 40, which is the ending logical address loaded thereinto in block 105 during signal $C_3$, to be applied to associative array comparator 35 for comparison with associative array 30.

In the previous description it was assumed that the physical page address corresponding to the ending logical address was in associative array 30, in which case the flow in FIG. 4 proceeded from blocks 106 and 101 to blocks 102 and 103 to begin accessing the operand. It will now be assumed that the physical page address corresponding to the ending logical address is not in associative array 30. Accordingly, instead of the flow being to blocks 102 and 103 in FIG. 4, the flow is to blocks 108 to 113 to perform the same operation on the segment and page portions of the ending logical address for deriving the location of the corresponding physical page address and loading it into associative array 30, as were performed on the starting logical address when it was found not to be in associative array 30. It will be understood that such operations in blocks 108 to 113 with respect to the segment and page portions of the ending logical address are accomplished as a result of outputs K and K' from latch LK being respectively true and false so as to cause AND gates 76 to be open while AND gates 32 are closed, whereby the ending logical address in sum register 40 is now used during blocks 108 to 113, instead of the starting logical address. It will also be understood that the segment register 45 in FIG. 2B need not be reloaded for the ending address operations in blocks 108 to 113, since the system is organized so that, although the operand may be on two different pages, both pages will correspond to the same segment table, in which case the origin address and segment table length loaded into segment register 45 at the start of operations is applicable during blocks 108 to 113 with respect to both the starting and ending logical addresses.

Since operation of the dynamic address translation unit for the segment and page portions of the ending logical address during blocks 108 to 113 in FIG. 4 are the same as described for the starting logical address, the description will not be repeated and attention is directed to the previous description with the understanding that it is the ending logical address which is involved rather than the starting logical address. When the operation indicated by block 113 have been completed for the ending logical address, the corresponding ending physical page address will have been loaded into associative array 30 along with the corresponding segment and page portions of the ending logical address. Operations will then return to blocks 100 and 101, which this time will find that the physical page address corresponding to the ending logical address is in associative array 30, resulting in the flow proceeding to blocks 102 and 103 to being accessing the operand, as described previously.

While the invention has been particularly shown and described with reference to a preferred embodiment thereof, it will be understood by those skilled in the art that various changes in form and details may be made therein without departing from the spirit and scope of the invention.

What is claimed is:

1. In a computer system, primary and secondary storage means organized into units of data with respect to the transfer of data therebetween, each unit of data being comprised of a plurality of sub-units of data, and an operand being comprised of one or more of said sub-units of data contained in one or more units of data, and
 accessing means for accessing an operand from said primary storage means in response to address data from said system, said accessing means being operable to inhibit accessing of an operand having sub-units contained in more than one of said units of data until after all units of data containing sub-units of data of the operand have been determined to be available for accessing from said primary storage means.

2. The invention in accordance with claim 1,
 wherein said primary storage means is of the virtual storage type, and
 wherein said accessing means provides for the accessing of a sub-unit of data from said primary storage means by translating the logical address of the sub-unit provided by said system into the actual physical address of the sub-unit in said primary storage means.

3. The invention in accordance with claim 2, wherein said accessing means includes
 an associative array for storing at least a predetermined portion of a plurality of logical addresses along with at least a predetermined portion of the physical addresses respectively corresponding thereto,
 comparison means for comparing at least a predetermined portion of an applied logical address with said plurality stored in said associative array, and
 means pointly responsive to a determination that all units of data containing sub-units of data of an operand are available and a successful comparison by said comparison means for causing the physical address portion in said association array corresponding to the applied logical address to be read out for application to said primary storage means.

4. The invention in accordance with claim 3, wherein each logical address contains a sub-unit portion which also serves as the sub-unit portion of the corresponding physical address, and wherein the predetermined portion of the physical address stored in said associative array is the physical address of a unit of data which when read out from said associative array is combined with the sub-unit portion of the applied logical address to form the resultant corresponding physical address applied to said primary storage means.

5. The invention in accordance with claim 3, wherein said accessing means also includes
 means responsive to an unsuccessful comparison by said comparison means for deriving from an applied logical address the location of the predetermined said primary storage means, and
 means for accessing the located predetermined portion of the corresponding physical address and for causing storage thereof in said associative array along with the predetermined portion of the applied sub-unit logical address.

6. The invention in accordance with claim 3, wherein said accessing means also includes
 means for determining whether the operand relates to an instruction which is of a predetermined type for which it is only necessary to determine that the unit of data corresponding to the applied logical address is available, and
 means responsive to the last mentioned means for causing a successful comparison by said comparison means occuring for an operand relating to an instruction of said predetermined type to be sufficient to cause read out from said associative array of the physical address portion corresponding to the applied logical address.

7. The invention in accordance with claim 1, wherein said accessing means includes
 first means for determining whether the sub-units of data of the operand are contained in more than one unit of data and if so then determining the availability of such units for accessing from the primary storage means, and
 second means responsive to said first means for in inhibiting accessing of the operand until said first means determines that the sub-units of data of the operand are contained in only one unit of data or if contained in more than one unit of data determines that all units of data containing sub-units of the operand are available for accessing from said primary storage means.

8. The invention in accordance with claim 7, wherein said first means includes means for employing the logical address of the first sub-unit of data of the operand for deriving the logical address of the unit of data containing the last sub-unit of data of the operand and for determining from this derivation whether the sub-units of data of the operand are contained in more than one unit of data and if so the availability of such units of data for accessing from the primary storage means.

9. The invention in accordance with claim 7, wherein said accessing means includes third means responsive to the determination by said first means of the unavailability in said primary storage means of a unit of data containing a sub-unit of data of the operand for indicating this unavailability to said system and for returning said accessing means to its initial condition.

10. The invention in accordance with claim 7, wherein said accessing means includes fourth means for determining whether the operand requested relates to an instruction which is of a predetermined type and fifth means responsive to said fourth means for permitting accessing of an operand relating to an instruction of said predetermined type when the unit of data corresponding to the applied logical address is available without the need of making any of the other determinations otherwise required by said first means.

11. In a computer system, page-organized storage means, and dynamic address translation means cooperating therewith for providing accessing of an operand from said storage means in response to operand logical addresses provided by said system, said dynamic address translation means being operable to translate an operand logical address into the actual physical address for application to said storage means conditional on the availability therein of all pages containing the operand, said dynamic address translation means including an associative array for storing a plurality of logical addresses along with at least a predetermined portion of each of the physical addresses corresponding thereto, comparison means for comparing at least a predetermined portion of an applied logical address with said plurality stored in said associative array, and means jointly responsive to a successful comparison by said comparison means and a determination of the availability of all pages of an operand for causing the physical address portion in said associative array corresponding to the applied logical address to be read out for application to said storage means.

12. The invention in accordance with claim 11, wherein each operand logical address contains segment, page and byte portions and each corresponding physical address contains a physical page address and the same byte portion as its corresponding logical address, and wherein the physical page address is the predetermined page portion stored in said associative array and which when read out from said associative array is combined with the byte portion of the applied logical address to form the resultant corresponding physical address applied to said storage means.

13. The invention in accordance with claim 12, wherein said dynamic address translation means also includes means responsive to an unsuccessful comparison by said comparison means for deriving from the segment and page portions of an applied logical address the location of the corresponding page address in said storage means and for causing storage thereof in said associative array along with the segment and page portions of the applied logical address.

14. In a computer system, page-organized virtual storage means, and dynamic address translation means cooperating therewith for providing accessing of an operand from said storage means in response to logical addresses applied thereto by said system, said operand having a starting logical address and an ending logical address respectively applied first and last by said system, said dynamic address translation means being operable to translate the logical address of an operand into its actual physical address for application to said storage means conditional on having determined the availability therein of all pages containing the operand prior to the accessing of any portion thereof, each logical address containing segment, page and byte portions and each corresponding physical address containing a physical page address and the same byte portion as its corresponding logical address, said dynamic address translation means including an associative array for storing the segment and page portions of a plurality of logical addresses along with the page portion of the physical address corresponding thereto, comparison means for comparing the segment and page portions of an applied logical address with those stored in said associative array, fetch means responsive to an unsuccessful comparison by said comparison means on an applied starting logical address for deriving from the segment and page portions thereof the location of the corresponding physical address in said storage means and for causing fetching thereof and storage in said associative array along with the corresponding segment and page portions of the applied starting logical address following which said comparison means is caused to repeat the comparison on the starting logical address, look-ahead means operative following a successful comparison by said comparison means with respect to the starting logical address of the operand for deriving the segment and page portions of the ending logical address of the operand and for determining whether the operand is contained on more than one page, means operative in response to the determination by said look-ahead means that the operand is contained on more than one page for causing the derived segment and page portions of the ending logical address to be applied to said comparison means for comparison with those stored in said associative array and in the event of an unsuccessful comparison for causing operation of said fetch means with respect to the segment and page portions of said ending logical address in the same manner as for said starting logical address following which said comparison means is caused to repeat the comparison on the ending logical address, and operand accessing means for causing the physical page address stored in said associative array corresponding to an applied logical address of an operand to be read out and combined with the byte portion of the applied logical address for application to said storage means when a successful comparison has been obtained by said comparison means for both the starting and ending logical addresses of the operand.

15. The invention in accordance with claim 14, wherein said fetch means includes means for determining the unavailability in said storage means of the page corresponding to the physical page address being located and for indicating such unavailability to said system.

16. The invention in accordance with claim 14, wherein said operand accessing means includes means for determining whether the operand relates to an instruction of a predetermined type, and means responsive to said last mentioned means determining that the operand relates to an instruction of said predetermined type for permitting said operand accessing means to operate in response to a successful comparison with respect to the applied logical address to read out the corresponding physical page address for combination with the byte portion of the applied logical address and application to said storage means.

17. In a computer system having a page-organized virtual storage means, a dynamic address translation means for providing accessing of an operand from said storage means by translating the operand logical addresses provided by said system into the actual operand physical addresses in said storage means, said dynamic address translation means including look-ahead means for looking ahead in response to the application of the starting address of an operand to determine whether the operand extends over more than one page and if so then determining whether all pages containing the operand are available for accessing from said storage means, and means responsive to said look-ahead means to permit the initiation of accessing of an operand only after all pages containing the operand have been determined to be available for accessing from said storage means.

References Cited

UNITED STATES PATENTS

| | | | |
|---|---|---|---|
| 3,217,298 | 11/1965 | Kilburn | 340—172.5 |
| 3,230,513 | 1/1966 | Lewis | 340—172.5 |
| 3,292,151 | 12/1966 | Barnes | 340—172.5 |
| 3,317,898 | 5/1967 | Hellerman | 340—172.5 |
| 3,317,902 | 5/1967 | Michael | 340—172.5 |
| 3,432,810 | 3/1969 | Cordero | 340—172.5 |

PAUL J. HENON, Primary Examiner

R. F. CHAPURAN, Assistant Examiner

UNITED STATES PATENT OFFICE
CERTIFICATE OF CORRECTION

Patent No. 3,533,075 October 6, 1970

Ellsworth L. Johnson et al.

It is certified that error appears in the above identified patent and that said Letters Patent are hereby corrected as shown below:

Column 1, line 36, "ssytems" should read -- systems --; line 59, "prgrams" should read -- programs --. Column 2, line 7, "instrutcion" should read -- instruction --. Column 3, line 54, "systems" should read -- system --. Column 4, line 11, "page oriented and" should read -- page oriented, and --; line 46, "for example 256" should read -- for example, 256 --. Column 5, line 11, "$S_2$" should read -- $S_1$ --. Column 7, line 7, beginning with "present" cancel all to and including "page is" in line 34, same column 7, and insert the same after "remains" in column 6, line 53. Column 7, line 41, "succeessfully" should read -- successfully --. Column 9, line 3, "the event of the" should read -- the event the --; line 10, "staarting" should read -- starting --. Column 10, lines 26 and 27, "100 and sponding" should read -- 100 and 101 to check whether the physical page address corresponding --; line 31, "OR gae" should read -- OR gate --; line 33, "ocurrence" should read -- occurrence --. Column 11, line 29, "108 and 113" should read -- 108 to 113 --. Column 13, line 20, "and operating AND" should read -- and opening AND --. Column 15, line 75, "means pointly" should read -- means jointly --. Column 16, line 4, "association array" should read -- associative array --. Column 16, line 22, "predetermined said" should read -- predetermined portion of the corresponding physical address in said --; lines 49 and 50, "for in inhibiting" should read -- for inhibiting --.

Signed and sealed this 27th day of April 1971.

(SEAL)
Attest:

EDWARD M.FLETCHER,JR.
Attesting Officer

WILLIAM E. SCHUYLER, JR.
Commissioner of Patents